(12) United States Patent
Burns et al.

(10) Patent No.: US 7,454,600 B2
(45) Date of Patent: Nov. 18, 2008

(54) METHOD AND APPARATUS FOR ASSIGNING THREAD PRIORITY IN A PROCESSOR OR THE LIKE

(75) Inventors: David W. Burns, Portland, OR (US);
James D. Allen, Portland, OR (US);
Michael D. Upton, Portland, OR (US);
Darrell D. Boggs, Aloha, OR (US);
David J. Sager, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 264 days.

(21) Appl. No.: 09/888,273

(22) Filed: Jun. 22, 2001

(65) Prior Publication Data

US 2002/0199088 A1    Dec. 26, 2002

(51) Int. Cl.
*G06F 9/46* (2006.01)
(52) U.S. Cl. ................ 712/219; 712/228; 718/103; 718/108
(58) Field of Classification Search ................ 712/228, 712/229, 219; 718/103, 107, 108
See application file for complete search history.

(56) References Cited

U.S. PATENT DOCUMENTS 6,404,161 B1 *   6/2002   Roubinet et al. ............. 318/705
6,542,921 B1 *   4/2003   Sager ......................... 718/108
6,606,639 B2 *   8/2003   Jacobson et al. ............. 707/201
2002/0138670 A1 * 9/2002   Johnson ........................ 710/6

FOREIGN PATENT DOCUMENTS

EP      0 488 501 A2      9/1991
WO      WO 99/21082      10/1998
WO      WO 01/04750 A1    6/2000

OTHER PUBLICATIONS

Susan J. Eggers et al., Simultaneous Multithreading: A Platform for Next-Generation Processors, Sep./Oct. 1997, IEEE Micro, pp. 12-19.
David W. Burns, Pre-Silicon Validation of Pentium4's SMT Capabilities, Intel Design and Test Technology Conference, pp. 1-5, no known publication date.

* cited by examiner

*Primary Examiner*—Tonia L M Dollinger
(74) *Attorney, Agent, or Firm*—Kenyon & Kenyon LLP

(57) ABSTRACT

In a multi-threaded processor, thread priority variables are set up in memory. The actual assignment of thread priority is based on the expiration of a thread precedence counter. To further augment, the effectiveness of the thread precedence counters, starting counters are associated with each thread that serve as a multiplier for the value to be used in the thread precedence counter. The value in the starting counters are manipulated so as to prevent one thread from getting undue priority to the resources of the multi-threaded processor.

12 Claims, 4 Drawing Sheets

METHOD AND APPARATUS FOR ASSIGNING THREAD PRIORITY IN A PROCESSOR OR THE LIKE

BACKGROUND OF THE INVENTION

The present invention pertains to the operation of a processor or the like. More particularly, the present invention pertains to assigning priority to a thread in a multi-threaded processor.

As is known in the art, a processor includes a variety of sub-modules, each adapted to carry out specific tasks. In one known processor, these sub-modules include the following: an instruction cache, an instruction fetch unit for fetching appropriate instructions from the instruction cache; decode logic that decodes the instruction into a final or intermediate format, microoperation logic that converts intermediate instructions into a final format for execution; and an execution unit that executes final format instructions (either from the decode logic in some examples or from the microoperation logic in others). As used herein final format instructions are referred to as microoperations.

Programming code to be executed by the processor can sometimes be broken down into smaller components referred to as "threads." A thread is a series of instructions whose execution achieves a given task. For example, in a video phone application, the processor may be called upon to execute code to handle video image data as well as audio data. There may be separate code sequences whose execution is designed to handle each of these data types. Thus, a first thread may include instructions for video image data processing and a second thread may be instructions for audio data processing. Stated another way, a thread is a self contained program that is usually associated with a thread identifier and during execution in a multi-threaded environment its architectural state can be maintained while executing instructions from another thread.

The use of multi-threaded processors has been suggested in the art. In such a processor, it may switch between execution of two or more threads. In other multi-threaded processors, the threads may be executed simultaneously. In either of these processors, there is no delineation between how the threads are treated. In particular, code from one thread is given the same priority as code from another thread. This could lead to a negative impact on overall system performance, especially when execution of critical code is suspended or slowed by the execution of non-critical code.

In view of the above, there is a need to assign priority between two or more threads.

DETAILED DESCRIPTION

Figure 1:
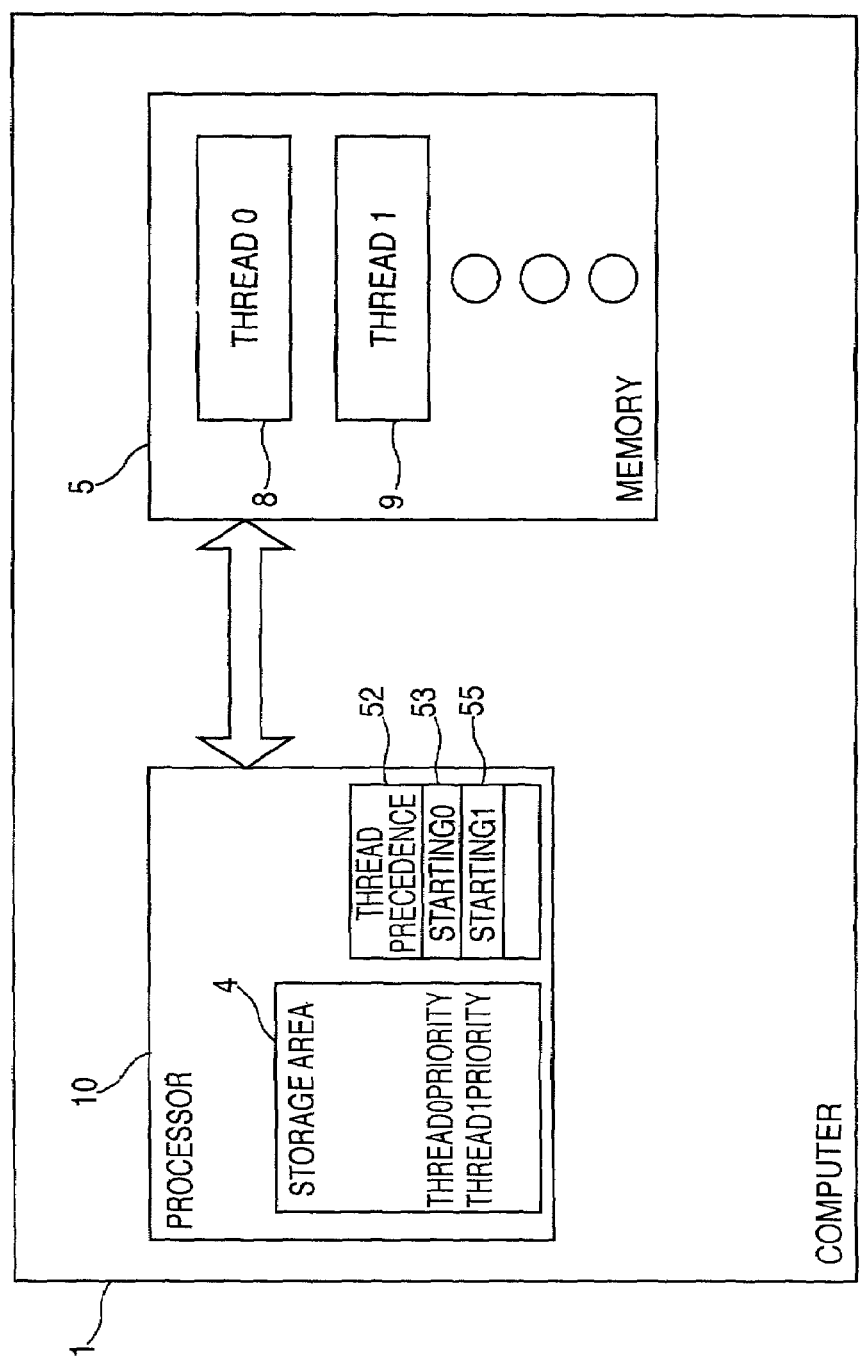
FIG. 1 is a block diagram of a computer system operated according to an embodiment of the present invention.

Referring to FIG. 1 a block diagram of a computer system operated according to an embodiment of the present invention is shown. In this example the computer system 1 includes a processor 3 which is capable of executing code stored in memory 5. In this example, memory 5 stores code for several threads, such as code for thread 0 (8), thread 1 (9), etc. As known in the art, code for two threads may be part of user applications and for the operating system.

Figure 2:
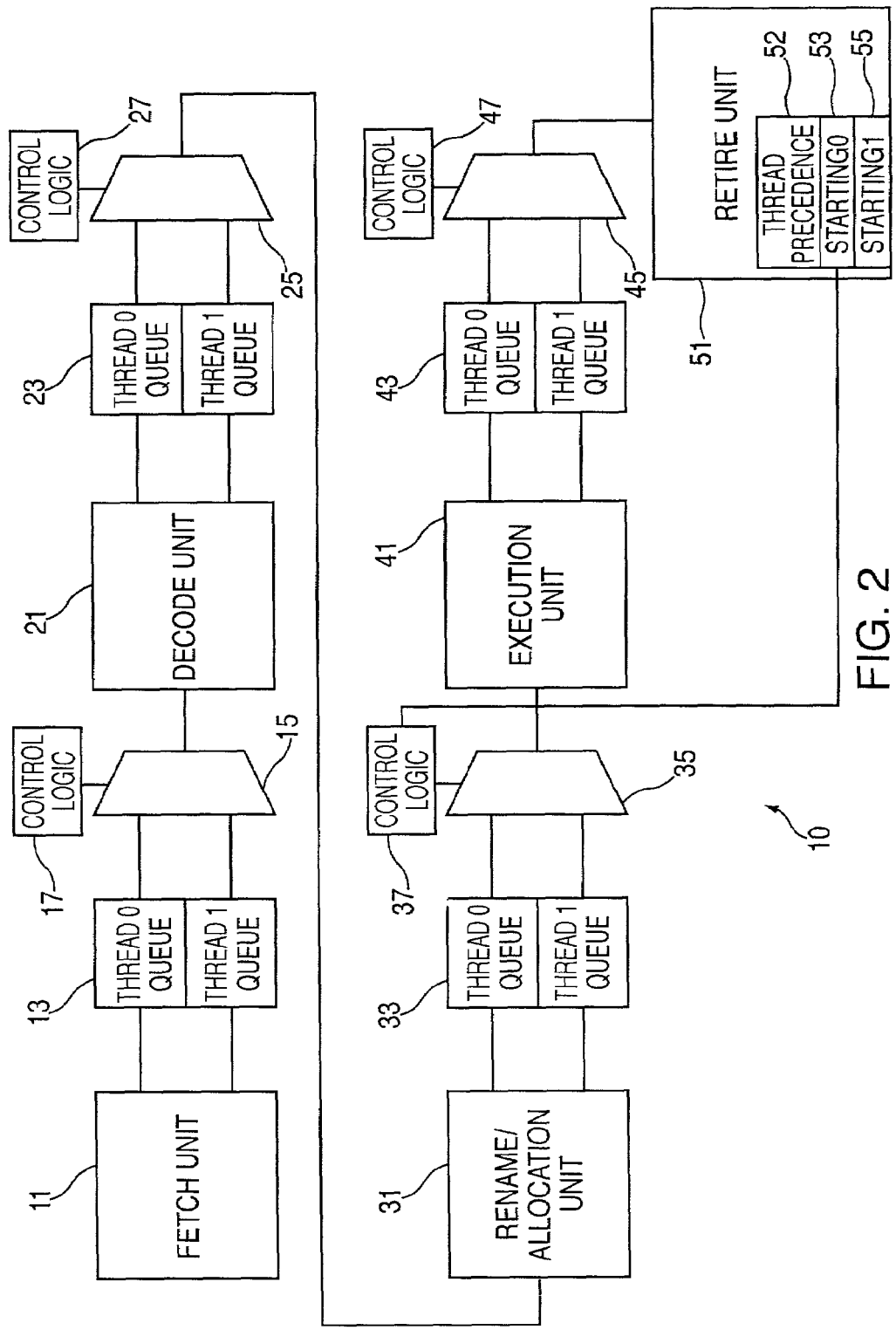
FIG. 2 is a block diagram of a portion of a processor constructed according to an embodiment of the present invention.

Referring to FIG. 2, a block diagram of a processor (e.g., a microprocessor, a digital signal processor, or the like) operated according to an embodiment of the present invention is shown. In this embodiment, the processor is a multi-threaded processor where the processor 10 is theoretically divided into two or more logical processors. As used herein, the term "thread" refers to an instruction code sequence. For example, in a video phone application, the processor may be called upon to execute code to handle video image data as well as audio data. There may be separate code sequences whose execution is designed to handle each of these data types. Thus, a first thread may include instructions for video image data processing and a second thread may be instructions for audio data processing. In this example, there are one or more execution units (e.g., including execution unit 41), which may execute one or more instructions at a time. The processor 10, however, may be treated as two logical processors, a first logical processor executing instructions from the first thread and a second logical processor executing instructions from the second thread.

In this embodiment of the processor 10, instructions and/or bytes of data are fetched by fetch unit 11 and supplied to a queue 13 and stored as part of the thread 0 queue or the thread 1 queue. One skilled in the art will appreciate that the queues used in processor 10 may be used to store more than two threads. Instructions from the two threads are supplied to a mulitplexer (MUX) 15, and control logic 17 is used to control whether instructions from thread 0 or thread 1 are supplied to a decode unit 21. Decode unit 21 may convert an instruction into two or more microinstructions and supplies the microinstructions to queue 23 (in a RISC (reduced instruction set code) processor, the instructions may already be in a decoded format and the decode unit 21 converts them into a format for execution). The outputs of queue 23 are supplied to a MUX 25 which supplies instructions from thread 0 or thread 1 to a rename/allocation unit 31 based on operation of control logic 27. The rename/allocation unit 31, in turn, supplies instructions to queue 33. MUX 35 selects between the thread 0 queue and the thread 1 queue based on the operation of schedule control logic 37, which can, for example, select instructions from thread0 and thread 1 based on available resources in execution unit 41. The output of MUX 35 is supplied to an out of order execution unit 41, in this embodiment, which executes the instruction. The instruction is then placed in queue 43. The outputs of queue 43 are supplied to a MUX 45 which sends instructions from thread 0 and thread 1 to a retire unit 51 based on the operation of control logic 47.

In FIG. 2, branch prediction circuitry may be added to assist in the efficiency of processor 10. For example, branch prediction circuitry may be added to fetch unit 11. As known in the art, branch prediction concerns predicting based on past history of execution code sequences, for example, whether a branch instruction (e.g., BNE—Branch if Not Equal) will be taken. Once a branch has been predicted, the next instruction can be loaded into the "pipeline" (e.g., the units leading up to the execution unit 41), so that if the branch is taken as predicted, the appropriate instructions are immediately available for the execution unit. If the branch prediction is incorrect, then the instructions in the pipeline are incorrect and must be flushed out and the appropriate instructions loaded into the pipeline.

In one example of a multi-threaded processor, two threads may be processed in parallel. Given the teachings herein, the present invention can be expanded to three or more threads processed in parallel. In this embodiment, the term "parallel" includes simultaneous and/or successive processing/execution of instructions. As used herein, thread priority is used to determine which thread gets to use shared resources when both threads need to use the same resource simultaneously. Thread priority could be indicated by one or more signals stored in a storage area 4 in the processor 10 (FIG. 1). For example, Thread0Priority and Thread1Priority would indicate which of the two threads (thread0 or thread1) has priority over the other. In one example, if both signals are turned off, then neither of the threads has priority over the other. In addition, three "counters" may be provided to assist in the assignment of thread priority. In FIG. 2, these counters may be provided as part of the retire unit 51. First, a precedence counter 52 is provided, which is set to an initial value (described below) and counts down to 0 in this embodiment. When the precedence counter 52 expires (e.g., 0 is reached), it is an indication to the processor 10 that the priority should be shifted from the thread that has priority to the thread that does not. A thread0 starting counter 53 and a thread1 starting counter 55 are also provided which store a value that will be used to set the initial value of the precedence counter (described below).

According to embodiments of the present invention, the thread precedence counter is adjusted to provide an appropriately sized time window based on the progress of a thread. For example, the progress of the thread can be based on the number of microoperations that are retired. When the thread precedence counter is set (e.g., after it expires), it can be reloaded with a value equal to a multiple of this value (up to a predetermined maximum) from the starting counter associated with the thread that will soon have priority. Accordingly, the starting counter should have a minimum value of 1.Thus, when a microoperation is retired by the retire unit 51, the starting counter for that thread can be set to 1 so that when it regains thread priority, the thread precedence counter will be set to a relatively low number. If, while a thread has priority, the thread precedence counter retires, and the thread was unable to retire a microoperation during that time window, the starting counter is incremented by a value (e.g., 1) so that the next time the thread has priority, it will have more time to retire at least one microoperation.

Using this method to assign precedence has at least two drawbacks. First, there is the chance that a thread will continue to have thread priority even though it is retiring microoperations, while the other thread is not able to retire microoperations during its thread priority time windows. For example, if thread0 includes one thousand consecutive division operations and a large thread priority window while thread1 includes one divide instruction, thread1 could be blocked until the execution of thread0 finishes the one thousand division operations or until the thread priority time window ends. In this embodiment, the thread priority time window is based on the amount of time it takes the thread precedence counter to expire after it is set. Second, if a thread is "starved" for instructions (i.e., resources are available for the execution of microoperations, but the fetching of instructions is curtailed), when that thread gets priority, the time made available by the thread precedence counter may be insufficient to allow the fetching of an instruction. This can be seen, for example, when using a page mis-handler or PMH which handles Data Translation Lookaside Buffers and Instruction Translation Lookaside Buffers and page and cache-line boundary issues. In such a case, the PMH may need to fetch instructions quickly because of a TLB miss, but will be unable to do so. Accordingly, the incrementing of the starting counter for that thread may need to be done a number of times before the resulting time made available by the thread precedence counter is sufficient to allow the fetching of instructions (which would eventually lead to the execution and retirement of microoperations for that thread). Thus, each time the execution of thread1 attempts and fails to load instructions, processing time for thread0 may be lost and the processing time for the instruction load failure is lost as well.

Figure 3:
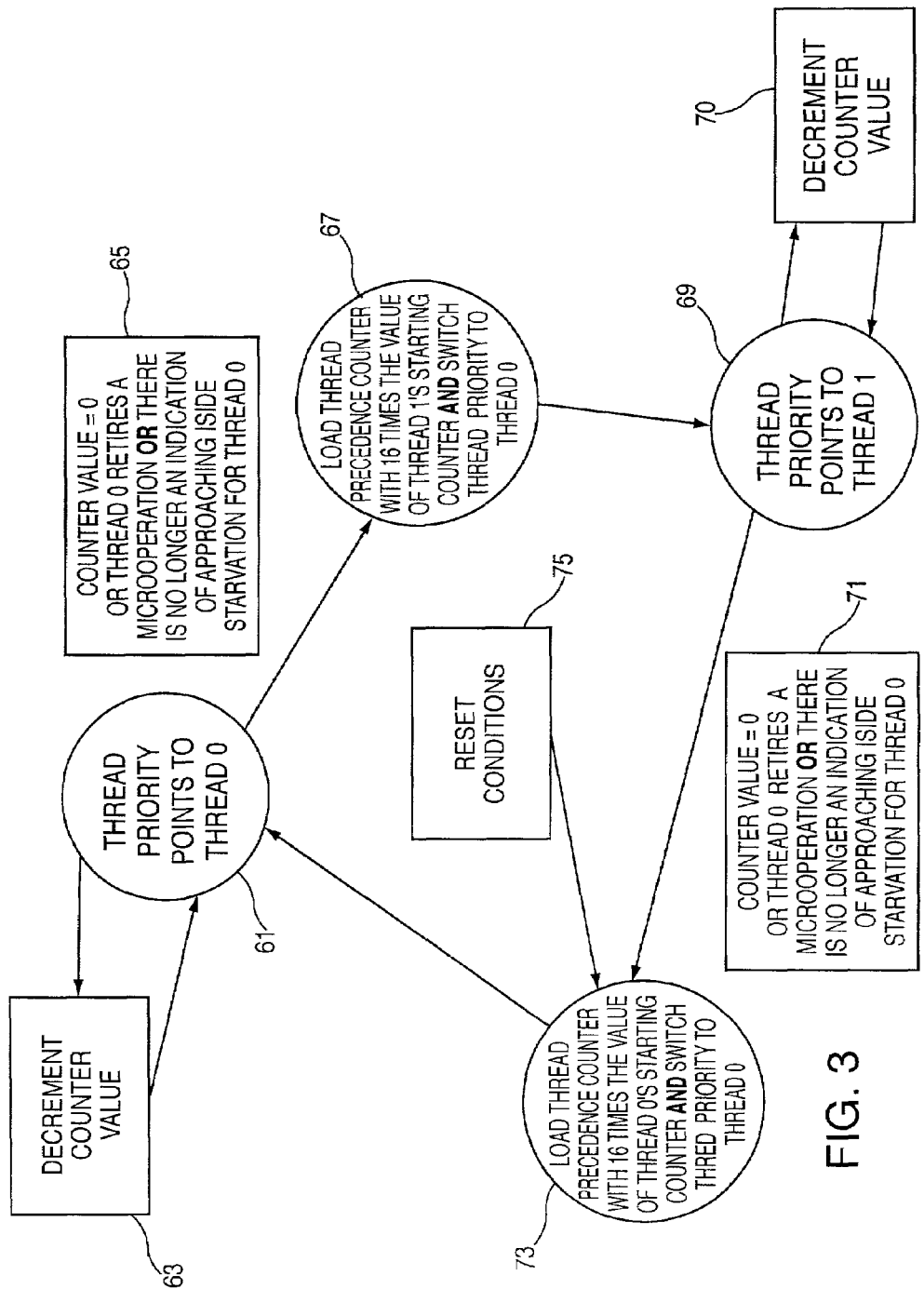
FIG. 3 is a state diagram for the assignment of thread priority according to an embodiment of the present invention.

According to an embodiment of the present invention, a system and method is presented that improves the performance of a multithreaded processor through the assignment of thread priority. Referring to FIG. 3, a state diagram for the assignment of thread priority according to an embodiment of the present invention is shown. In state 61, thread priority points to a first thread, thread0. The thread precedence counter is decremented 63 according to a system clock for the processor, in this embodiment. As indicated by block 65, the state changes from state 61 to state 67 when one of the following conditions is satisfied:

1. The thread precedence counter has reached 0;
2. Thread0 retires a microoperation;
3. There is no longer an indication of approaching Instruction side (Iside) starvation for thread0.

Iside starvation is when a thread cannot fetch instructions because the other thread(s) has/have effectively blocked it from doing so. As used herein, an indication of approaching Iside starvation is an indication that such a situation may be approaching for a thread. An indication of approaching Iside starvation can be anticipated through the monitoring of one or more conditions. In one embodiment, the conditions may include one or more of the following:

1. The processor is in a multi-threaded processing mode as compared to a single threaded processing mode and more than one thread is active.
2. The thread under consideration does not have any instructions in the execution pipeline (e.g., there are no instructions waiting at MUX 35 for the schedule control logic 37 to cause microoperations for that thread to be passed to the execution unit 41 (FIG. 2).
3. The issuing of new instructions to the execution pipeline is not blocked because the thread under consideration has filled a needed resource. In this embodiment, the execution pipeline includes the processing of instructions from the MUX 35 through the execution unit 41. For example, the execution unit 41 may include a store buffer for the thread under consideration that is filled with store instructions. In such a case, the processing of the thread has not necessarily been negatively impacted by the lack of instruction fetching, but the delay in execution of store instructions.
4. A thread other than the one under consideration has not been given full or exclusive access to the processor modules. In other words, this condition is not satisfied if another thread has been given full or exclusive access to processor modules. In such a situation, any instruction starvation on the part of the thread under consideration would be intended.
5. The thread under consideration is in a state where it is trying to fetch instructions. For example, many processors including those manufactured by Intel Corporation (Santa Clara, Calif.) include a "Stop Clock" pin. An assertion of a signal on this pin results in the processor clearing out its resources. In this case, all resources may be clear of executable instructions for the thread under consideration. Accordingly, the lack of instruction fetching would not be considered starvation in such a case. Switching from a multi-thread mode to a single thread mode is another example in which instruction starvation should not be considered a problem.

6. A higher order performance saving protocol is not active. For example, if there is another protocol in effect to switch priority from one thread to another, then running this protocol with instruction starvation handling of the present invention may have a negative impact on processor performance.
7. An instruction starvation enable bit is set (i.e., bit that can be set by control logic to turn off Iside starvation detection/resolution).
8. The thread under consideration is not waiting for an instruction fetch that has gone off-chip (e.g., off the processor such as main memory).

In this embodiment, if all monitored conditions are met then there is an indication of approaching Iside starvation for thread0. Though eight conditions are presented above, the present invention can be expanded to additional conditions or a fewer number of conditions. For example, the indication of approaching Iside starvation could be based solely on conditions 1, 2, and 5 above being true.

In block 67, thread priority is being changed from thread0 to thread1. The thread precedence counter is loaded with a value equal to 16 multiplied by the value in a second thread's (thread1) starting counter. At this time, the thread priority signals are switched to indicate that thread1 has priority over thread0. Control then passes to block 69 where thread1 has priority and the thread precedence counter is decrementing according to a system clock (block 70). As indicated by the conditions in block 71, the state changes from block 69 to block 73 when one or more conditions are met. In this embodiment, the state changes when any of the following three conditions are met:
1. The thread precedence counter reaches 0;
2. Thread0 retires a microoperation;
3. There is no longer an indication of approaching Iside (Instruction side) starvation for thread1.

In state 73, the thread precedence counter is loaded with sixteen multiplied by the value in thread1's starting counter and the appropriate thread priority signals are switched to indicate that thread0 has priority. Control then passes back to block 61. Upon reset of the processor (block 75), the actions of state 73 are taken and thread0 is given priority in this embodiment.

Figure 4:
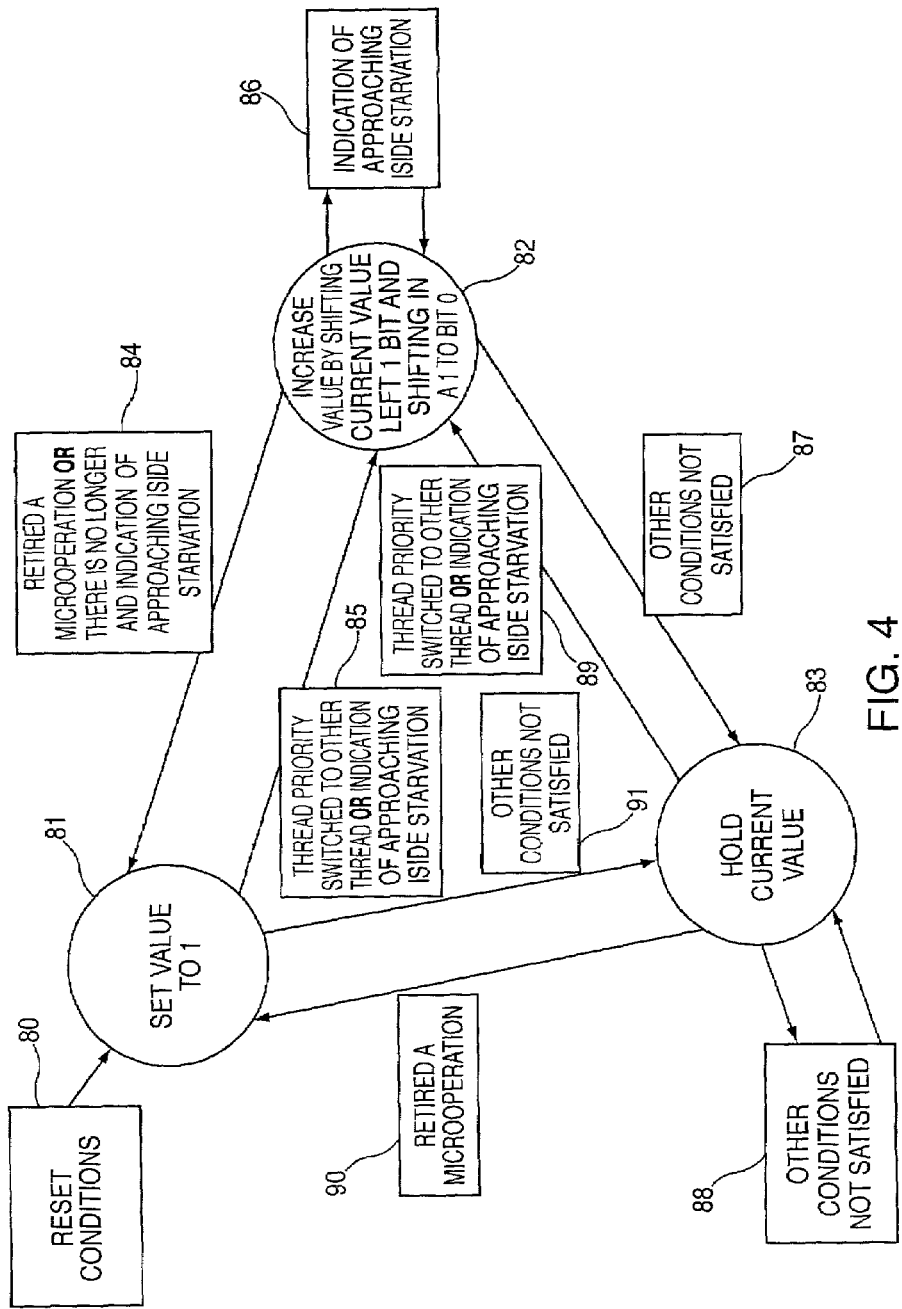
FIG. 4 is a state diagram for setting the starting counter of one of thread0 and thread1 according to an embodiment of the present invention.

Referring to FIG. 4, a state diagram for setting the starting counter of one of thread0 and thread1 is shown according to an embodiment of the present invention. Upon reset (block 80), control passes to block 81 where the value for the starting counter is set to 1. To go from block 81 to block 82, one of two conditions (block 85) are to be met:
1. Thread priority has switched to another thread before the current thread was able to retire a microoperation;
2. There is an indication of approaching instruction side starvation for the current thread.

In block 82, the value in the starting counter is modified geometrically (e.g., by shifting in a binary 1 bit and shifting all bits to the left). For example, a 1 value would be made a 3 value, a 3 value would be made a 7 value and a $2^n-1$ value would be made a $2^{n+1}-1$ value (where n>0). Control remains in state 82 while there is an indication of an approaching Iside starvation (block 86). In this embodiment, for every system clock, the value in the starting counter is incremented as discussed above until a maximum value is reached. Control moves back to block 81 if one of the following conditions occur (block 84):
1. A microoperation for that thread is retired;
2. There is no indication of approaching Instruction side starvation for the thread.

Control passes from block 82 to block 83 if "Other conditions" are not satisfied. In this embodiment, if control passed from block 81 to block 82 because thread priority has switched to another thread before the current thread was able to retire a microoperation, then control passes from block 82 to 83 if the following "other" conditions are not satisfied:
1. The thread under consideration has retired a microoperation; and
2. The thread priority signal has not switched to the thread under consideration. (block 87). In other words, the value in the counter is to be maintained at the same value if the thread has not retired a microoperation and this thread has thread priority. Control remains in block 83 where the current value in the starting counter is held at the same value as long as the other conditions are not satisfied (block 88). Control returns to block 82 if one of the following conditions are met (block 89):
1. Thread priority switched from the current thread to another thread before a microoperation could be retired;
2. There is an indication of approaching Instruction side starvation for the thread.

Control passes from block 83 to block 81 if the thread retires a microoperation (block 90). Finally, control passes from block 81 to block 83 when other conditions are not satisfied (block 91). Using the method and system of the present invention, the problems referred to above may be avoided. The implementation of the flow diagrams of FIGS. 3 and 4 can be performed by properly configured control logic (e.g., including control logic 37 in FIG. 2). Alternatively, control logic can be a sub-module of the processor 10 that executes instructions to implement the flow diagrams of FIGS. 3 and 4.

Although several embodiments are specifically illustrated and described herein, it will be appreciated that modifications and variations of the present invention are covered by the above teachings and within the purview of the appended claims without departing from the spirit and intended scope of the invention.

What is claimed is:

1. A method of assigning thread priority comprising:
   assigning priority to a first thread in a multi threaded processor; and
   assigning priority to a second thread in response to one of a plurality of conditions being true, the conditions consisting of
   if a thread precedence counter expires;
   if processing of said first thread retires an instruction from said first thread; and
   if there is not an indication of approaching instruction side starvation for said first thread wherein instruction fetching for said first thread would be blocked due to processing one or more instructions from another thread, and wherein said indication of approaching instruction side starvation for said first thread includes each of a plurality of conditions being true, the plurality of conditions including each of the following
   if the processor is operating in a multithreaded processing mode;
   if the first thread has no instructions in an execution pipeline of said processor; and
   if the first thread is attempting to fetch instructions from a memory.

2. A processor, comprising:
   control logic to assign priority to one of at least first and second threads; and a thread precedence counter coupled to said control logic wherein priority is assigned to said second thread after said thread precedence counter expires wherein said control logic is to determine if there is an indication of approaching instruction side starvation for said first thread wherein instruction fetching for said first thread would be blocked due to processing one or more instructions from another thread, and to increment a value stored in said first starting counter if there is an indication of approaching instruction side starvation for said first thread, and wherein said control logic is to determine if there is an indication of approaching instruction side starvation for said first thread by determining if each of a plurality of conditions are true, the plurality of conditions including each of the following if the processor is operating in a multithreaded processing mode;

if the first thread has no instructions in an execution pipeline of said processor; and if the first thread is attempting to fetch instructions from a memory.

3. The processor of claim 2 wherein said control logic is to increment the value stored in the first starting counter geometrically.

4. The processor of claim 3 wherein said value is to be incremented geometrically by left-shifting a binary 1 bit into said value.

5. A processor comprising:

control logic to assign priority to a first thread and to assign priority to a second thread in response to one of a plurality of conditions being true, the conditions consisting of if a processing counter expires;

if processing of said first thread retires an instruction from said first thread; and if there is not an indication of approaching instruction side starvation for said first thread wherein instruction fetching for said first thread would be blocked due to processing one or more instructions from another thread wherein said indication of approaching instruction side starvation for said first thread includes each of a plurality of conditions being true, the plurality of conditions including each of the following if the processor is operating in a multithreaded processing mode;

if the first thread has no instructions in an execution pipeline of said processor; and if the first thread is attempting to fetch instructions from a memory.

6. A computer system comprising:

a memory to store instructions for first and second threads;

a processor including control logic coupled to said memory to assign priority between said first and second threads; and a thread precedence counter coupled to said control logic wherein priority is assigned to said second thread after said thread precedence counter expires wherein said control logic is to determine if there is an indication of approaching instruction side starvation for said first thread wherein instruction fetching for said first thread would be blocked due to processing one or more instructions from another thread and to increment a value stored in said first staffing counter in response to an indication of approaching instruction side starvation for said first thread, wherein a preliminary value for said thread precedence counter is based on a value stored in a first staffing counter associated with said first thread, and wherein said control logic is determine if there is an indication of approaching instruction side starvation for said first thread by determining if each of a plurality of conditions are true, the plurality of conditions including each of the following if the processor is operating in a multithreaded processing mode;

if the first thread has no instructions in an execution pipeline of said processor; and if the first thread is attempting to fetch instructions from a memory.

7. The computer system of claim 6 wherein said control logic is to increment the value stored in the first staffing counter geometrically.

8. The computer system of claim 7 wherein said value is to be incremented geometrically by left-shifting a binary 1 bit into said value.

9. A computer system comprising:

a memory to store instructions for first and second threads;

a processor including control logic to assign priority to said first thread and to assign priority to said second thread in response to one of a plurality of conditions being true, the conditions consisting of:

if a thread precedence counter expires;

if processing of said first thread retires an instruction from said first thread; and if there is not an indication of approaching instruction side starvation for said first thread wherein instruction fetching for said first thread would be blocked due to processing one or more instructions from another thread, wherein said indication of approaching instruction side starvation for said first thread includes each of a plurality of conditions being true, the plurality of conditions including each of the following if the processor is operating in a multithreaded processing mode;

if the first thread has no instructions in an execution pipeline of said processor; and if the first thread is attempting to fetch instructions from a memory.

10. A set of instructions residing in a storage medium, said set of instructions to be executed by a processor to handle processing of at least first and second threads in parallel and assign thread priority comprising:

assigning priority to said first thread;

loading a preliminary value to a thread precedence counter;

assigning priority to said second thread after said thread precedence counter expires;

determining if there is an indication of approaching instruction side starvation for said first thread wherein instruction fetching for said first thread would be blocked due to processing one or more instructions from another thread; and incrementing a value stored in said first starting counter is incremented in response to an indication of approaching instruction side starvation for said first thread, wherein said preliminary value is based on a value stored in a first starting counter associated with said first thread, and wherein determining if there is an indication of approaching instruction side starvation for said first thread includes determining if each of a plurality of conditions are true, the plurality of conditions including each of the following if the processor is operating in a multithreaded processing mode;

if the first thread has no instructions in an execution pipeline of said processor; and if the first thread is attempting to fetch instructions from a memory.

11. The set of instructions of claim 10 wherein said value is incremented geometrically.

12. The set of instructions of claim 11 wherein said value is incremented geometrically by left-shifting a binary 1 bit into said value.

* * * * *